US009585178B2

(12) United States Patent
Liao

(10) Patent No.: US 9,585,178 B2
(45) Date of Patent: Feb. 28, 2017

(54) METHOD FOR HANDLING PROXIMITY-BASED SERVICE DISCOVERY AND COMMUNICATION IN A WIRELESS COMMUNICATIONS SYSTEM

(71) Applicant: HTC Corporation, Taoyuan, Taoyuan County (TW)

(72) Inventor: Ching-Yu Liao, Taoyuan (TW)

(73) Assignee: HTC Corporation, Taoyuan (TW)

( * ) Notice: Subject to any disclaimer, the term of this patent is extended or adjusted under 35 U.S.C. 154(b) by 160 days.

(21) Appl. No.: 14/283,925

(22) Filed: May 21, 2014

(65) Prior Publication Data
US 2014/0348081 A1    Nov. 27, 2014

Related U.S. Application Data

(60) Provisional application No. 61/825,538, filed on May 21, 2013.

(51) Int. Cl.
*H04W 76/02* (2009.01)
*H04W 8/00* (2009.01)
(Continued)

(52) U.S. Cl.
CPC .......... *H04W 76/023* (2013.01); *H04L 67/16* (2013.01); *H04W 8/005* (2013.01); *H04W 4/008* (2013.01)

(58) Field of Classification Search
CPC .. H04W 76/023; H04W 76/021; H04W 4/008; H04L 67/16
See application file for complete search history.

(56) References Cited

U.S. PATENT DOCUMENTS

2013/0287012 A1* 10/2013 Pragada ............. H04W 76/045
370/338
2013/0288668 A1* 10/2013 Pragada ............... H04W 12/06
455/426.1
(Continued)

OTHER PUBLICATIONS

3GPP TR 23.703 V0.3.0 (Apr. 2013), "3rd Generation Partnership Project; Technical Specification Group Services and System Aspects; Study on architecture enhancements to support Proximity Services (ProSe) (Release 12)".
(Continued)

*Primary Examiner* — Omer S Mian
(74) *Attorney, Agent, or Firm* — Birch, Stewart, Kolasch & Birch, LLP

(57) ABSTRACT

A method for handling Proximity-based Service (ProSe) discovery, comprising: performing a ProSe communication preparation procedure, in response to a received ProSe discovery request message, with a first UE and a second UE, for guiding ProSe discovery between the first UE and the second UE, wherein the received ProSe discovery request message indicates ProSe identifiers of the first UE and the second UE for ProSe communication and the ProSe communication preparation procedure comprises transmitting a first request message including scheduled information for the first UE and a second request message including scheduled information for the second UE, to the first UE and to the second UE respectively, and receiving response messages from the first and second UE; determining if a direct radio link between the first UE and the second UE is feasible for ProSe communication based on the received response messages from the first and second UE.

6 Claims, 7 Drawing Sheets

(51) Int. Cl.
*H04L 29/08* (2006.01)
*H04W 4/00* (2009.01)

(56) References Cited

U.S. PATENT DOCUMENTS

| | | | | |
|---|---|---|---|---|
| 2014/0022986 A1* | 1/2014 | Wu | ............... | H04W 48/16 370/328 |
| 2014/0078952 A1* | 3/2014 | Bontu | ............... | H04W 76/023 370/312 |
| 2014/0193794 A1* | 7/2014 | Olander, III | ............... | G09B 7/06 434/362 |
| 2014/0297565 A1* | 10/2014 | Montgomery | ............... | G06Q 40/06 705/36 R |
| 2014/0335791 A1* | 11/2014 | Kim | ............... | H04W 4/008 455/41.2 |
| 2014/0378123 A1* | 12/2014 | Stojanovski | ............... | H04W 52/0251 455/422.1 |
| 2015/0079899 A1* | 3/2015 | Hakola | ............... | H04W 8/005 455/39 |
| 2015/0087233 A1* | 3/2015 | Kim | ............... | H04W 4/008 455/41.2 |
| 2015/0142986 A1* | 5/2015 | Reznik | ............... | H04L 67/16 709/228 |
| 2015/0146577 A1* | 5/2015 | Kim | ............... | H04W 12/08 370/259 |
| 2015/0146637 A1* | 5/2015 | Morita | ............... | H04W 76/023 370/329 |

OTHER PUBLICATIONS

3GPP TS 23.401 V12.0.0 (Mar. 2013), "3rd Generation Partnership Project; Technical Specification Group Services and System Aspects; General Packet Radio Service (GPRS) enhancements for Evolved Universal Terrestrial Radio Accesss Network (E-UTRAN) access (Release 12)".

* cited by examiner

METHOD FOR HANDLING PROXIMITY-BASED SERVICE DISCOVERY AND COMMUNICATION IN A WIRELESS COMMUNICATIONS SYSTEM

CROSS REFERENCE TO RELATED APPLICATIONS

The present application is based on claims the benefit of U.S. Provisional Application No. 61/825,538 filed on May 21, 2013, the entirety of which is incorporated by reference herein.

TECHNICAL FIELD

Aspects of the present invention relate generally to methods for wireless communications systems and, more particularly, to methods for handling Proximity-based Service (ProSe) discovery and communication in a wireless communications system.

BACKGROUND

In a typical mobile communications environment, a user equipment (UE) device such as a mobile phone (also known as a cellular or cell phone), a laptop computer with wireless communications capability, or a personal digital assistant (PDA), may communicate voice and/or data signals with one or more service networks. The wireless communications between the UE and the service networks may be in compliance with various wireless technologies. A long-term evolution (LTE) system, initiated by the third generation partnership project (3GPP), is now being regarded as a new radio interface and radio network architecture that provides a high data rate, low latency, packet optimization, and improved system capacity and coverage. An evolution of core network with non-radio access aspects, known as System Architecture Evolution (SAE), is also initiated by 3GPP in accompanying with LTE.

Evolved Packet System (EPS) is a purely IP based network, consisting of user equipments (UEs), a LTE radio access network known as Evolved Universal Terrestrial Radio Access Network (E-UTRAN), and a SAE core network known as Evolved Packet Core (EPC). The EPS uses the concept of "EPS bearers" to route IP traffic from a gateway in external packet data networks to the UE. A bearer is an IP packet flow with a specific Quality of Service (QoS) between the gateway and the UE. The E-UTRAN is simply a network of plurality of evolved Node-Bs (eNBs) communicating with a plurality of UEs, which generate a flat architecture and there is no centralized controller. The eNBs are normally inter-connected via the X2-interface and towards the EPC by the S1-interface. The EPC includes a mobility management entity (MME), a Home Subscriber Server (HSS), a serving gateway (SGW), a packet data network gateway (PDN GW or PGW). The MME deals with the control plane. It handles the signalling related to mobility and security for E-UTRAN access. The MME is responsible for the tracking and the paging of UE in idle-mode. It is the termination point of the Non-Access Stratum (NAS). The MME handles bearer management and connection management. The HSS is a database that contains user-related and subscriber-related information. The HSS also provides support functions in mobility management, call and session setup, user authentication and access authorization. The Serving GW is the point of interconnect between the radio-side and the EPC, and it serves the UE by routing the incoming and outgoing IP packets. The PDN GW is the point of interconnect between the EPC and external IP networks called PDN (Packet Data Network), and it routes packets to and from the PDNs.

A long term evolution-advanced (LTE-A) system, as its name implies, is an evolution of the LTE system and has a similar network structure to the LTE system.

In LTE-related systems, Proximity-based Service (ProSe) communication has been developed as a technology which allows UEs to communicate directly with each other in close proximity without transmitting/receiving data and/or control signals to the other via an eNB, which means a local or direct path can be used between the UEs. Therefore, in the 3GPP LTE spectrum, the operator can move the data path (i.e., user plane) off the access to core networks to direct links between the UEs.

Regarding proximity discovery procedures, it is still not clear how the network conducts proximity discovery for two UEs located in proximity and determines to set up proximity communication for two UEs within E-UTRAN coverage.

In addition, some problems may be encountered while performing the proximity discovery procedures in the wireless communications system. For example, power consumption on channels due to a lack of E-UTRAN coordination between two ProSe-enabled UEs, radio link quality for reducing UE's power consumption between two ProSe-enabled UEs in the proximity, potential interference caused by other general UEs in the proximity, delay time resulting from fine tracking on UEs' geographical locations, which may require the ProSe-enabled UEs to report location information for aiding the accuracy of the estimated locations, and so on. As a result, a method for implementing proximity-based service (ProSe) discovery and communication that may solve these problems is required.

SUMMARY

A detailed description is given in the following embodiments with reference to the accompanying drawings.

Methods for handling Proximity-based Service (ProSe) discovery and communication in wireless communications systems are provided.

In one exemplary embodiment, the invention is directed to a method for implementing Proximity-based Service (ProSe) discovery and communication for a base station in a wireless communications system, comprising: performing a ProSe communication preparation procedure, in response to a received ProSe discovery request message, with a first user equipment (UE) and a second UE in the wireless communications system which are served by the base station, for guiding ProSe discovery between the first UE and the second UE among which one is an announcing UE and the other is a monitoring UE, wherein the received ProSe discovery request message indicates ProSe identifiers of the first UE and the second UE for ProSe communication and the ProSe communication preparation procedure comprises transmitting a first request message including scheduled information for the first UE and a second request message including scheduled information for the second UE, to the first UE and to the second UE respectively, and receiving response messages from the first UE and the second UE; determining if a direct radio link between the first UE and the second UE is feasible for ProSe communication based on the received response messages from the first UE and the second UE.

In one exemplary embodiment, the invention is directed to a method for handling Proximity-based Service (ProSe)

discovery and communication for a Mobility Management Entity (MME) in a wireless communications system, comprising: performing a ProSe communication setup procedure with a base station in the wireless communications system, for establishing an Evolved Packet System (EPS) bearer for a ProSe communication between the first UE and the second UE, wherein the ProSe communication setup procedure comprises following steps: generating and storing a correlation identification that correlates EPS bearer identifier of the first UE and the EPS bearer identifier of the second UE for the ProSe communication; and transmitting bearer setup request messages respectively for the first UE and the second UE including the correlation identification to the base station, to request the base station to establish an EPS bearer for the first UE and an EPS bearer for the second UE, respectively.

A detailed description is given in the following embodiments with reference to the accompanying drawings.

DRAWINGS

The present invention can be more fully understood by reading the subsequent detailed description and examples with references made to the accompanying drawings, wherein.

Figure 4A:
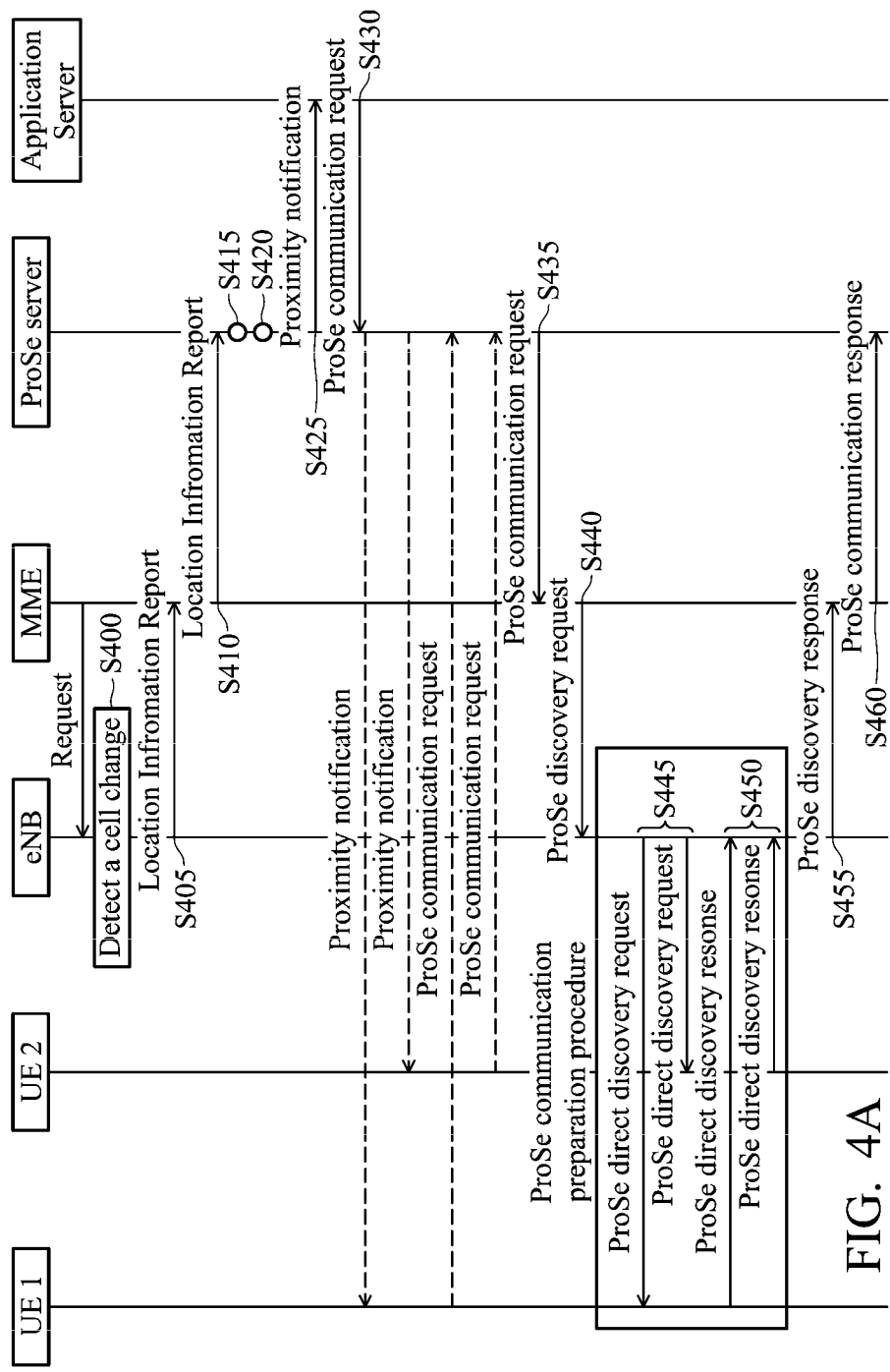
Figure 4B:
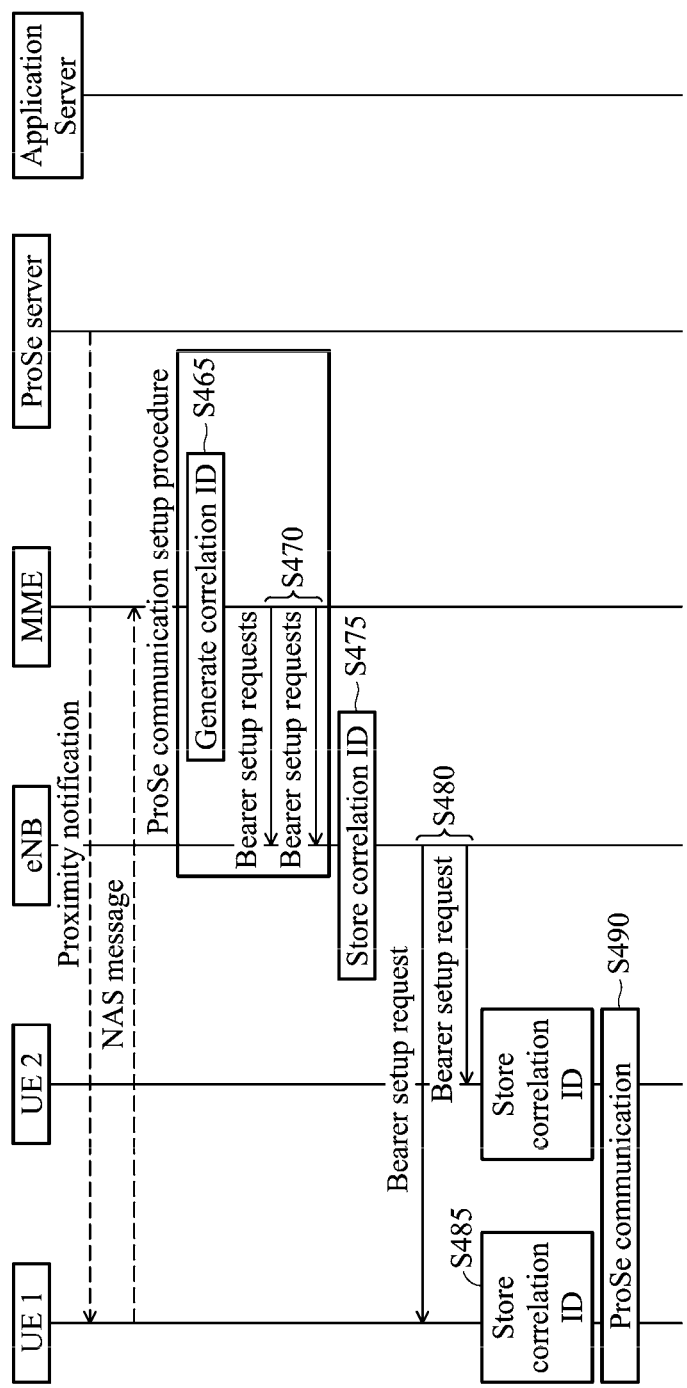

FIGS. 4A~4B illustrate a network assisted ProSe discovery and ProSe communication setup procedure in view of an Evolved Packet System (EPS) according to an embodiment of the present invention.

Figure 5:
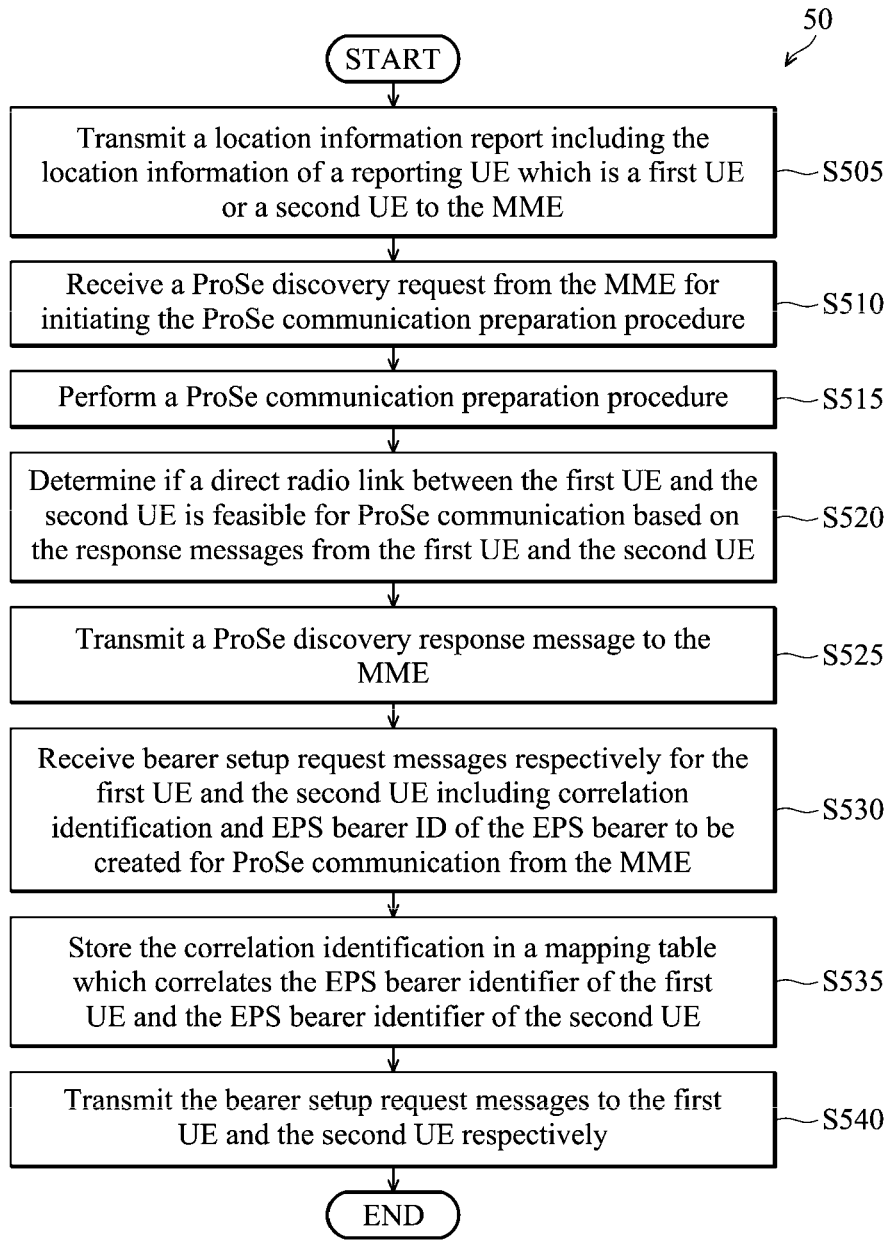

FIG. 5 is a flow chart of a process illustrating a method for handling Proximity-based Service (ProSe) in a wireless communications system according to an embodiment of the invention with reference to the system in FIGS. 4A~4B.

Figure 6:
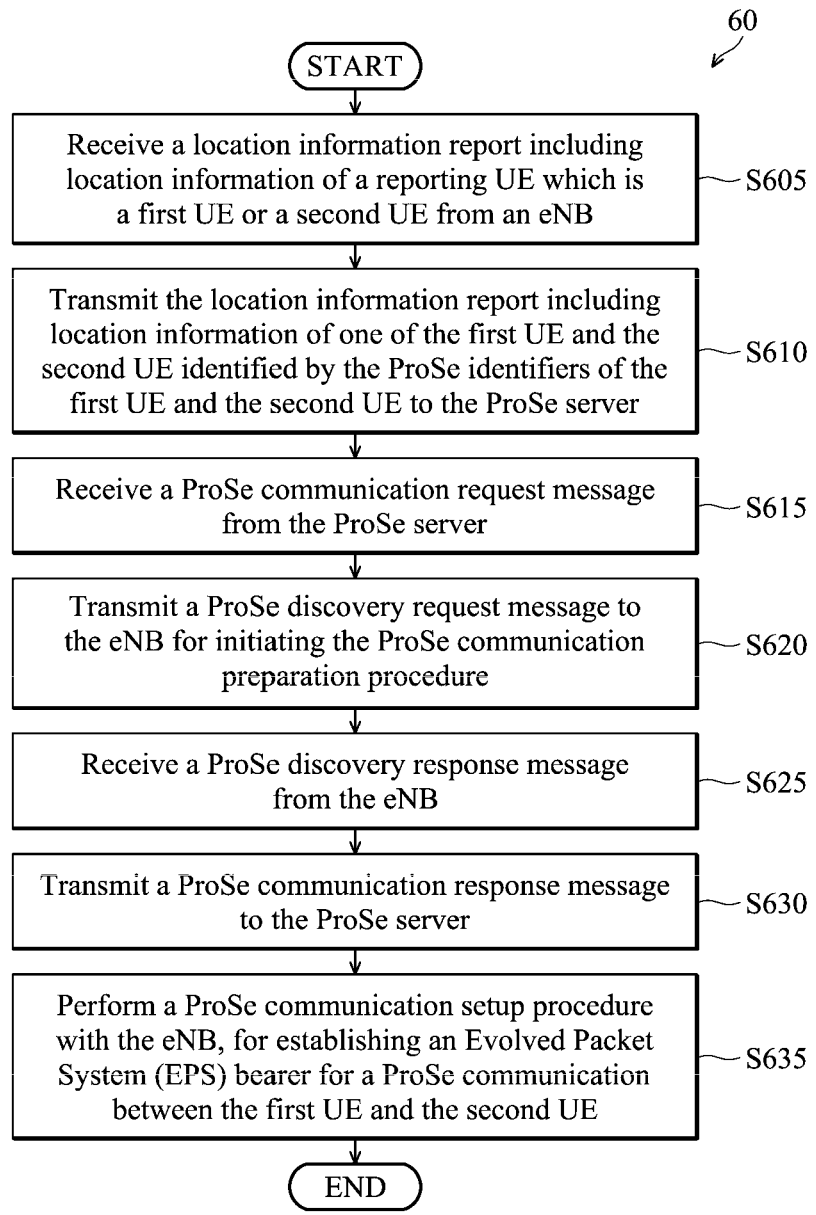

FIG. 6 is a flow chart of a process illustrating a method for handling Proximity-based Service (ProSe) in a wireless communications system according to an embodiment of the invention with reference to the system in FIGS. 4A~4B.

DETAILED DESCRIPTION

Several exemplary embodiments of the application are described with reference to FIG. 1 to FIG. 6, which generally relate to methods for handling Proximity-based Service (ProSe) discovery and communication in a wireless communications system.

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof. Note that the 3rd Generation Partnership Project (3GPP) specifications described herein are used to teach the spirit of the invention, and the invention is not limited thereto.

In 3GPP specifications, a base station is typically referred to as a Node B, an evolved or enhanced Node B (eNB), a home enhanced or evolved Node B (HeNB) or some other similar terminology. As the scope of the invention should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote a wireless communication device and/or a base station. The term "application" shown in the description means a ProSe application as the application which supports ProSe functionality.

DEFINITIONS

The following definitions are provided to promote understanding of the present invention.

ProSe identifier (ProSe ID)—an identifier of a device (UE).

Application identifier (App ID)—an identifier of an application.

Application user identifier (User ID)—a user account belonging to a user, wherein the user may have one or more User IDs registered for an application.

Figure 1:
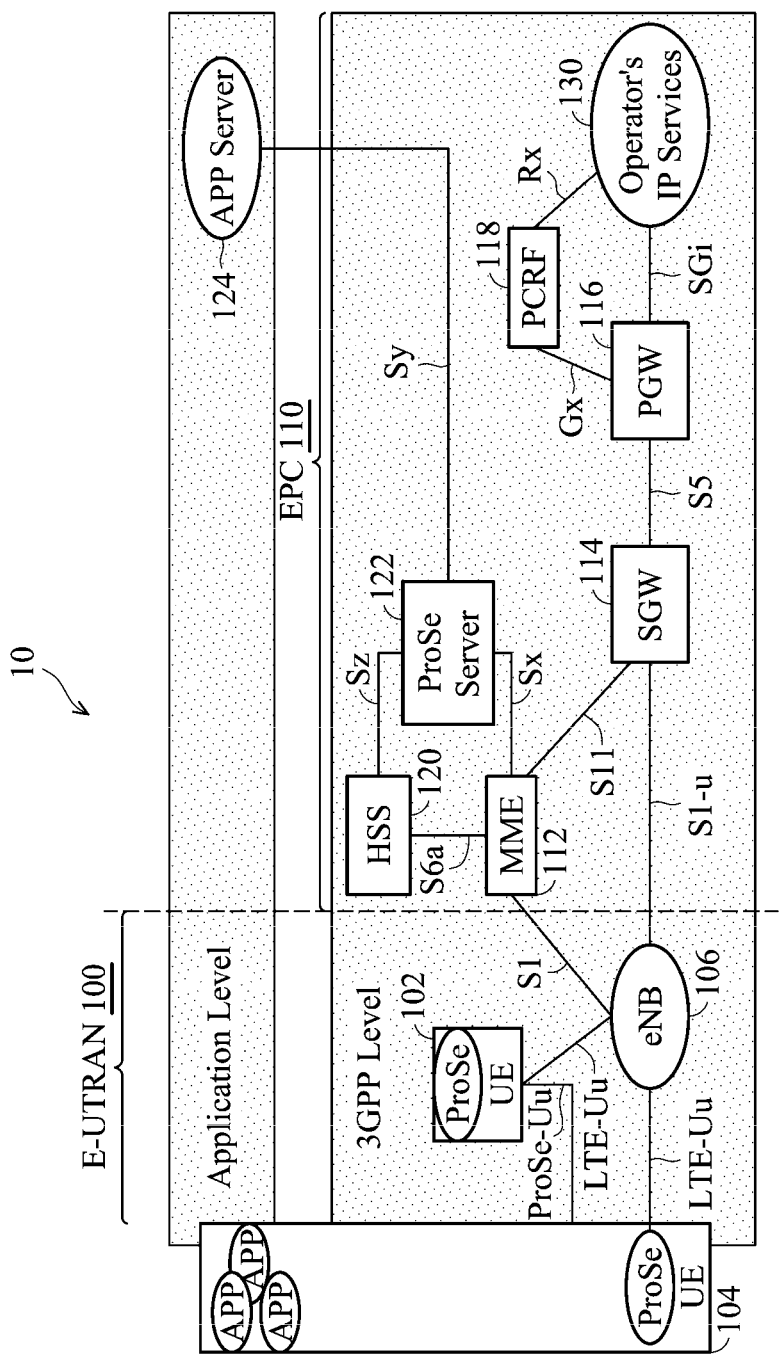
FIG. 1 illustrates an Evolved Packet System (EPS) for the Proximity Services (ProSe) in the Long Term Evolution (LTE) system according to an embodiment of the present invention.

FIG. 1 illustrates an Evolved Packet System (EPS) 10 for the Proximity Services (ProSe) according to an embodiment of the present invention. In addition, FIG. 1 further illustrates the relationship of the ProSe entities at the UE, the ProSe associated network entities in the Evolved Packet Core (EPC), and the application entities. The EPS uses the concept of "EPS bearers" to route IP traffic from a gateway in the PDN to the UE. A bearer is an IP packet flow with a specific Quality of Service (QoS) between the gateway and the UE. In FIG. 1, an EPS 10 includes a first UE 102, a second UE 104, an Evolved Universal Terrestrial Radio Access Network (E-UTRAN) 100 and an Evolved Packet Core (EPC) 110, wherein each UE (the UE 102 or 104) includes only one ProSe entity and one or more applications utilizing the ProSe functionality, each application denoted as APP. The ProSe entity in each UE (e.g. UE 102 or 104) is utilized for the ProSe operations of discovery and communication. The ProSe entity communicates with the ProSe Server 122 on top of Non Access Stratum (NAS) signaling. APP(s) is an entity at the UE representing the third party applications or application instances in the UE designed for utilizing the proximity services. There may be more than one APP utilizing the ProSe functionality at the same time.

The E-UTRAN 100 includes one or more base stations, evolved Node-Bs (eNB) 106, which provides a user plane and a control plane and the eNB 106 communicates with each UE (e.g., UE 102 and the UE 104) via LTE-Uu interfaces. The UEs 102 and 104 communicate with each other via a ProSe-Uu interface. The core network, the EPC 110, controls the UEs and manages establishment of the bearers, and includes a Mobility Management Entity (MME) 112, a serving gateway (SGW) 114, a packet data network gateway (PGW) 116, a Policy and Charging Rules Function (PCRF) 118, a Home subscriber Server (HSS) 120, a ProSe server 122, etc. The ProSe server 122 is further is connected to an application server 124 which may be set in the operator side or the service/application provider side. The MME 112, the SGW 114, and the PGW 116 can be implemented in a gateway box. In some embodiments, the SGW 114 and PGW 116 can be implemented on separate network devices.

The MME 112 provides mobility management and session management on UEs by control plane signaling using Non-Access Stratum (NAS) protocols where the NAS packets is transported over S1-MME interfaces between the MME 112 and the eNB 106. The MME 112 and the SGW 114 communicate with each other via a S11 interface. The SGW 114 forwards and receives packets to and from the eNB 106 via an S1-u interface. The S1-u interface supports per-bearer user plane tunneling and inter-eNB path switching during handover.

The PGW 116 is connected to an external packet network (e.g., the Internet or operator's IP service center 130) via a SGi interface and is connected to the SGW 114 via an S5 interface. The PGW 116 serves IP address allocation for the UEs, as well as QoS enforcement and flow-based charging according to rules from the PCRF 118. The PGW 116 also serves as the mobility anchor for inter-working with non-3GPP technologies such as CDMA2000 and WiMAX networks.

The PCRF 118 serves to perform policy control decision-making, as well as controlling the flow-based charging functionalities. In addition, the PCRF 118 communicates with the PGW 116 via a Gx interface, and with the operator's IP service center 130 via an Rx interface.

The HSS 120 is connected to the MME 112 via an s6a interface and stores subscriber data for each subscriber in the EPS 10. The subscriber data includes ProSe subscription information, related ProSe preference settings, a subscription profile, authentication vectors, and a list of allowed Access Point Names (APNs) for each subscriber. Each APN has a list of allowed PGWs for the subscriber. An APN may be considered as the network name (e.g., Internet, corporate intranet, etc.) associated with a particular packet data network (PDN).

The ProSe server 122 communicates with the MME 112 via an Sx interface which transfers ProSe related subscription information in the corresponding PLMN, communicates with the HSS 120 via an Sz interface which transfers ProSe related subscription and authentication data for authenticating/authorizing user access to the ProSe services, and communicates with the application server 124 via an Sy interface. The ProSe server 122 supports ProSe operations and is responsible for ProSe registration, control and authorization, charging and parameterization. For example, the ProSe server 122 authorizes the UE 102 and the UE 104 to use the ProSe service, such as to transmit/receive data or signaling directly with each other and to use any other features provided by the ProSe server 122. For example, a ProSe service can be a ProSe communication, or a ProSe direct discovery.

The application server 124 communicates with the ProSe server 122 for ProSe application user registration (a.k.a. user registration), authorization and control of the third-party application access to the ProSe services, via the Sy interface.

Figure 2:
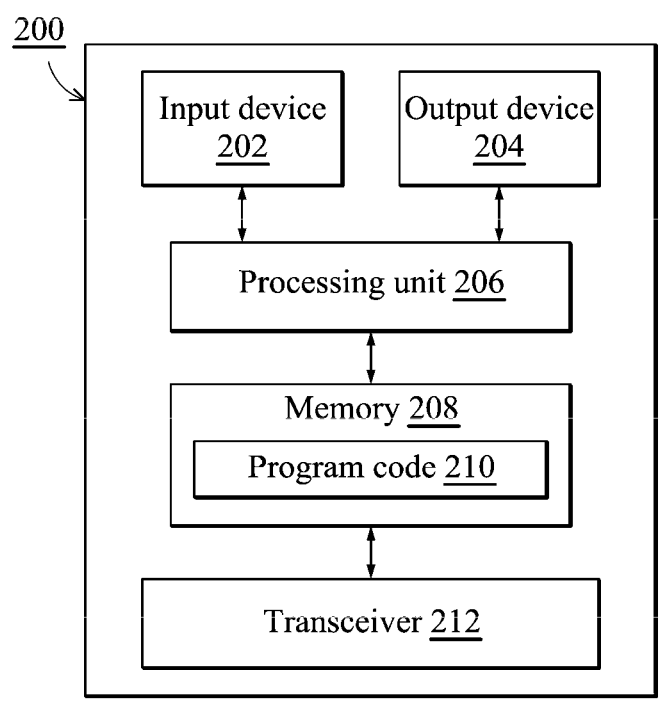
FIG. 2 is a functional block diagram of a communications device according to one embodiment of the present invention.

FIG. 2 is a functional block diagram of a communications device 200 according to one embodiment of the present invention. As shown in FIG. 2, the communication device 200 can be the first UE 102 or the second UE 104, the eNB 106, the MME 112, the ProSe server 122 or the ProSe application server 124 of FIG. 1, and the communications device 200 is preferably used in the LTE system, the LTE-A system or any other similar wireless communications system. The communications device 200 may include an input device 202, an output device 204, a processing unit 206, a memory 208, a program code 210, and a transceiver 212. The processing unit 206 can be a Central Processing Unit (CPU), a microprocessor, or an Application Specific Integrated Circuit (ASIC) which is able to execute the program code 210 in the memory 208 and transmits the processing results of the program code 210 to the transceiver 212 to be transmitted on the air. The communications device 200 can receive signals input by a user through the input device 202, such as a keyboard keypad, touch screen, or microphone (for voice input), and can output images and sounds through the output device 204, such as a screen or speakers. The signal input/output from and to the input device 202 and output device 204 can also be processed by the processing unit 206. The transceiver 212 is used to receive and transmit radio signals under the processing unit 206.

Figure 3:
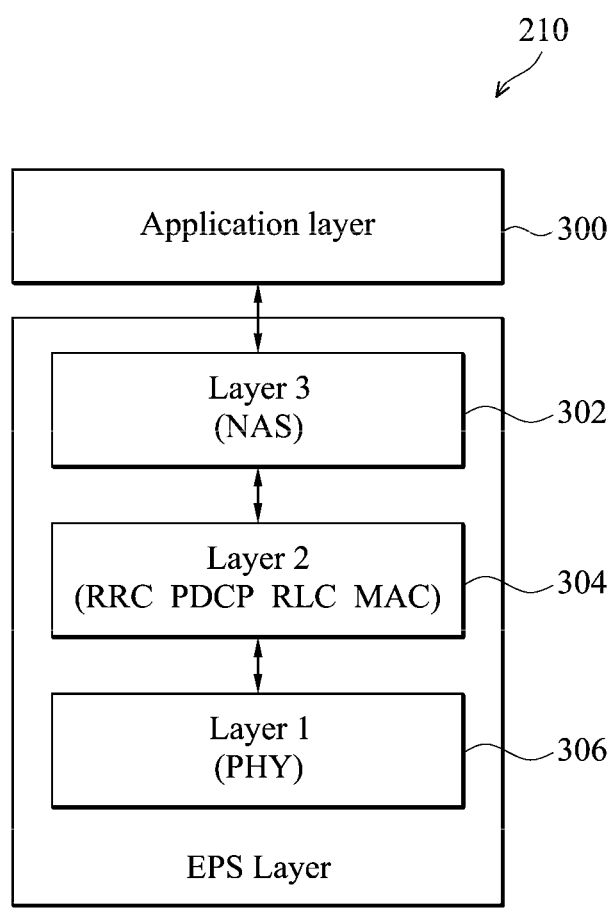
FIG. 3 is a simplified block diagram of the program code shown in FIG. 2 in accordance with one embodiment of the invention.

FIG. 3 is a simplified block diagram of the program code 212 shown in FIG. 2 in accordance with one embodiment of the invention. In this embodiment, the program code 210 is provided in many protocol layers and illustrated in a protocol stack structure, including an application layer 300 (in the user plane), a Layer 3 302 (as a Non Access Stratum (NAS) layer), and a Layer 2 304 (including a Medium Access Control (MAC) layer, a Radio Link Control (RLC) layer, a Packet Data Convergence Protocol (PDCP) layer) and a Radio Resource Control (RRC) layer), and is coupled to a Layer 1 306 (as a Physical (PHY) layer). The integration of Layers 1 to 3 can be regarded as a whole as an EPS layer. In other words, the program code 310 in the application layer (a.k.a upper layer) can transmitted/received signaling or data to the EPS layer by using LTE/LTE-A technologies; the application layer implements the operations of APP entities, and the EPS layer can implement the operations of the ProSe entity.

The application layer 300 performs signaling/data/media information exchange via user plane messages between the UE and the network. It is required that the UE has IP connectivity with the network. For example, if a user plane interface is applied between a UE and a ProSe server, the UE needs to obtain IP connectivity and then it can start to communicate with ProSe server. The Layer 3 (NAS) 302 handles the mobility management, e.g., to exchange location information and attachment status, and session management and communications between the MME 112 and the UEs by NAS messages.

For the description below it is assumed that:
The ProSe-enabled UE has registered to the ProSe server and obtains a ProSe ID.
The ProSe-enabled UE has registered to the ProSe application server with a user ID.
The ProSe-enabled UEs to discover and to be discovered are within E-UTRAN coverage and in a connected mode.

Please note that, in the following embodiments, a ProSe service established between the UEs takes a ProSe communication as an example for simplicity. That is, two UEs in proximity can apply ProSe communication to transmit or receive data packets via a direct radio link between instead of the eNB in the EPS infrastructure. However, ProSe communication is not the only service that UEs can use, and other ProSe services such as ProSe discovery (in which the UE discovers the other UEs in proximity) can also be the service referenced in the following embodiment. Another example for the case that two UEs have ongoing data/signal/media transmission between them, the proposed embodiments can also be utilized to seamlessly offload the traffic packets from the EPS infrastructure route to the direct link route by applying both of the ProSe discovery and ProSe communication procedures. The proposed embodiments are also applicable to the reverse case that is to seamlessly transfer from the direct radio link route back to the EPS infrastructure route. Depending on the applications requiring the ProSe service, the following embodiment can be implemented in different form, and the scope is not limited herein.

FIGS. 4A~4B illustrate a network assisted ProSe discovery and ProSe communication setup procedure in view of an Evolved Packet System (EPS) according to an embodiment of the present invention. The procedure is separable into two parts. The first part is a network assisted ProSe discovery procedure (as FIG. 4A), and the second part is a ProSe communication setup procedure (as FIG. 4B). The EPS using the network assisted ProSe discovery and ProSe communication setup procedure of FIGS. 4A~4B can be the EPS 10 in FIG. 1, where each entity can be referred to the EPS 10. The cooperating entities are the first UE (UE 1), second UE (UE 2), eNB, MME, ProSe server and Application server. Note that, UE 1 UE 2 shown in FIGS. 4A~4B includes an Application layer which is given description in the above. One of UE 1 and UE 2 can be an announcing UE which acts as a transmitter and the other can be a monitoring UE which acts as a receiver.

In FIG. 4A, the network assisted ProSe discovery procedure is further separable into 2 phases. The first phase is an EPC-level Prose discovery procedure, and the EPC-level Prose discovery procedure comprises the steps S400~S420. Note that, before the stage of the network assisted ProSe discovery and ProSe communication setup procedure, two UEs as UE 1 and UE 2 interested in ProSe communication has been registered with the ProSe server such that the ProSe server activates the EPC-level ProSe discovery procedure towards the EPS network (including MME and eNB) to monitor location information for both UEs interested in ProSe communication.

In step S400, the eNB detects if a cell change of a reporting UE (UE 1 or UE 2) occurs in response to a request from the MME which is for requesting location information of the reporting UE whenever the reporting UE matches a configured criterion, e.g., the change of the Cell, the periodic period, etc. When the eNB detects a cell change of the reporting UE, in step S405, the eNB transmits a location information report including location information of the reporting UE to the MME, wherein the location information includes at least one of an Evolved Universal Terrestrial Radio Access Network (E-UTRAN) cell global identity (EGCI) and a tracking area identity (TAI). Alternatively, the location information report may be transmitted by the eNB in response to a request from the MME which is for requesting current location information of the reporting UE. Please note that the location information of the camping cell and tracking area for a UE in the connected mode is available in the eNB, and the way how the eNB acquires location information of the UE is known to those skilled in the art and is not included or limited in the present invention. For example, the location information can be obtained by positioning methods utilized in positioning procedures, e.g. LPP (LTE positioning protocol) or LPPa (LTE positioning protocol and LPP Annex) procedure. Different position reporting formats may be adopted and each is associated with Geographical Area Discription (GAD) shape.

Next, in step S410, the MME transmits the location information report including location information of one of UE 1 and UE 2 identified by ProSe identifiers of UE 1 and UE 2 to the ProSe server. Thus, the ProSe server obtains and translates the location information of the UE so as to check the available location information based on a proximity criterion. In step S415, the ProSe server determines that the reporting UE and the other UE (as UE 1 and UE 2) are located in a proximity area according to user discovery preference settings of UE 1 and UE 2 and a proximity criterion associated with the location information of UE 1 and UE 2. Noted that the proximity criterion can be in many different forms in terms of the network configuration and the available information obtained from the MME and eNB. For example, the ProSe server can take the EGCI value as the proximity criterion for determining the proximity of two UEs registered for the Proximity service, i.e. two UEs are located in the cell with the same ECGI or in the neighboring cells according to the configuration information. For another example, if Location service (a.k.a LCS) is supported and the available location information is geometry coordinates or GAD, the proximity criterion may be the relative distance between two UEs for ProSe service. At this point, the ProSe server only refers to coarse location information to determine if the configured proximity criterion is matched between both UEs. Some information other than the location information may also be taken into account in step S415, e.g. roaming policies for the registered PLMNs of both UEs, network capabilities of both UEs' registered network entities for performing ProSe communication for both UEs, etc.

In step S420, the ProSe server authorizes the ProSe discovery and the ProSe communication between UE 1 and UE 2. As shown above, the purpose of the EPC-level Prose discovery procedure is to obtain the location information of one of UE 1 and UE 2, so that the ProSe server can determine that UE 1 and UE 2 are located in the proximity area according to the location information and authorizes the ProSe discovery and ProSe communication between UE 1 and UE 2.

The second phase in FIG. 4A is a ProSe direct discovery procedure which is illustrated by steps S425~S460. In step S425, the ProSe server transmits a proximity notification message to the application server to notify that UE 1 and UE 2 are located in the area that fits the proximity criterion. In step S430, the ProSe server receives a ProSe communication request message from the application server, wherein the ProSe communication request message includes information of the users' profile for performing the ProSe communication. The users' profile may indicate the preferred proximity criterion of ProSe direct discovery and the users' discovery preferences on announcement or monitoring, etc. In another case (e.g., depicted by dotted lines between step S430 and step S435), the ProSe server may transmit a first proximity notification message and a second proximity notification message respectively to UE 1 and to UE 2 to notify that UE 1 and UE 2 are located in the proximity area for ProSe communication. Then, the ProSe server receives a first ProSe communication request message from UE 1 and a second ProSe communication request message from UE 2 for requesting the ProSe server to perform the ProSe communication between UE 1 and UE 2. In another case (not shown in FIG. 4), after receiving Proximity notification message in step S425, the application server may transmit a first proximity notification message and a second proximity notification message respectively to UE 1 and to UE 2 to notify that UE 1 and UE 2 are located in the proximity area for ProSe communication. After the application server receives a first ProSe communication request message from UE 1 and a second ProSe communication request message from UE 2 (which are sent in response to the respective proximity notification messages), for requesting the ProSe server to perform the ProSe communication between UE 1 and UE 2, the application Server then transmits a ProSe communication request message to the ProSe server as in step S430. With the interaction information with the Application server or the UEs, the ProSe server then transmits the ProSe communication request message to the MME.

After the ProSe server authorizes the ProSe discovery and the ProSe communication between the UE 1 and the UE 2, in step S435, the MME receives the ProSe communication request message from the ProSe server Next, in step S440, the MME transmits a ProSe discovery request message to the eNB for initiating a ProSe communication preparation procedure. Note that, in another embodiment, the ProSe discovery request message that the eNB receives may be sent from UE 1 or UE2 before performing the ProSe communication preparation procedure, which means that UEs may be able to trigger the ProSe communication preparation procedure.

The ProSe communication preparation procedure includes step S445 and step S450. The eNB performs the ProSe communication preparation procedure, in response to a received ProSe discovery request message, with UE 1 and UE 2 in the wireless communications system which are served by the eNB, for guiding ProSe discovery between UE 1 and UE 2. Note that, one is an announcing UE (as a transmitter) and the other is a monitoring UE (as a receiver). The eNB generates scheduled information for UE 1 and for UE 2 based on radio frequency, transmission power, uplink radio resources for the announcing UE, and downlink radio resources for the monitoring UE. In step S445, the eNB transmits ProSe direct discovery request messages to the UE 1 and the UE 2, respectively, wherein the ProSe direct discovery request messages include scheduled information for UE 1 and UE 2, respectively. In step S450, the eNB receives ProSe direct discovery response messages from UE 1 and UE 2 and determines if a direct radio link between UE 1 and UE 2 is feasible for the ProSe communication based on the received ProSe direct discovery response messages from UE 1 and UE 2. Noticeably, before the eNB can determine the result of the ProSe direct discovery between UE1 and UE2 to complete the ProSe communication preparation procedure and respond to the MME, the eNB may repeat the ProSe communication preparation procedure for requesting ProSe discovery for a number of times, by dynamically scheduling the radio resources of the ProSe direct discovery procedures between UE 1 and UE 2. In this case, the MME may suggest the periodicity of the ProSe communication preparation procedure to the eNB when sending the ProSe discovery request message to the eNB. Please note that, the ProSe direct discovery request message and the ProSe direct discovery response message is for ProSe direct discovery procedure between two UEs capable of Proximity service. Additionally, when requesting the UEs to perform ProSe direct discovery procedure, the eNB may indicate the duration of time for ProSe direct discovery in the ProSe direct discovery request message to the UEs, such that the UEs can applies the allocated radio resource for ProSe direct discovery in the predetermined duration. By this way, the eNB may save some signaling messages for scheduling the radio resources for the ProSe direct discovery procedure. The present invention is not limited to the examples for dynamic scheduling radio resources in guiding the ProSe direct discovery procedure. In practical cases, there are many forms of scheduling policies for the eNB to optimize the radio resources allocation, which are also in this context.

After the eNB determines the result of the ProSe discovery based on the ProSe direct discovery response messages from UE 1 and UE 2, in step S455, the eNB transmits a ProSe discovery response message to the MME. The ProSe discovery response message transmitted to the MME may include a positive result notifying a successful ProSe discovery when the eNB determines that the direct radio link between UE 1 and UE 2 is feasible for ProSe communication, or the ProSe discovery response message transmitted to the MME includes a failure cause when the eNB determines that the direct radio link between UE 1 and UE 2 is infeasible for ProSe communication. In addition, the eNB may determine to establish a locally-routed data path for ProSe communication between UE 1 and UE 2, after determining that the direct radio link between UE 1 and UE 2 is infeasible for ProSe communication. The locally-routed data path is associated with EPS bearers of UE 1 and UE 2 and the eNB exchanges the data packets towards two UEs instead of individually traversing the received data packets to the EPC infrastructure via user plane path, e.g. S-GW/P-GW, towards two UEs.

Next, in step S460, the MME transmits a ProSe communication response message to the ProSe server, wherein the ProSe discovery response message indicates the success or failure of the ProSe communication. Additionally, the ProSe discovery response message may also indicate the type of communication route is determined to apply, e.g. infrastructure route, locally routed route, or direct communication route, wherein the information can be included in the ProSe discovery response message sending from the eNB after it determines the feasibility of the ProSe communication between two UEs and chooses the communication route for the connection between two UEs.

After obtaining the ProSe discovery response message from the eNB about the result of the ProSe communication preparation procedure, the MME then initiates a ProSe communication setup procedure if determining to start the ProSe direct communication procedure for both UEs by activating EPS bearer for both UEs and correlating the allocated EPS bearers for the direct link between two UEs.

FIG. 4B illustrates the ProSe communication setup procedure. The ProSe communication setup procedure is performed in step S465 and step S470 by the MME for the ProSe communication between the first UE and the second UE (as UE 1 and UE 2). In step S465, the MME generates and stores a correlation identification (Correlation ID) that correlates a EPS bearer identifier of UE 1 and the a EPS bearer identifier of UE 2 for the ProSe communication. Noticeably, for each UE, the ProSe related information may be stored in a ProSe Context at the MME, wherein the ProSe context may be a part of UE context or a new profile for UE requesting ProSe service. Here the ProSe contexts of UE 1 and UE 2 have the information of the same Correlation ID and the respective allocated EPS bearer IDs used for ProSe direct communication with each other. Further, the MME stores and maintains a mapping table with information of Correction ID, two associated EPS bearers of UE 1 and UE 2, where each UE is identified by a UE identifier, e.g. ProSe ID, GUTI, or IMSI, etc. Next, in step S470, the MME transmits bearer setup request messages respectively to UE 1 and UE 2 including the correlation identification and the allocated EPS bearer ID to the eNB, to request the eNB to establish an EPS bearer for UE 1 and an EPS bearer for UE 2, respectively.

Alternatively, (as steps illustrated by dotted lines before step S465), the MME may receive a Nom Access Stratum (NAS) message for requesting the ProSe communication setup procedure from one of UE 1 and UE 2, wherein the NAS message is sent by UE 1 or UE 2 in response to a proximity notification message from the ProSe server or the application server.

After the eNB receives the bearer setup request messages from the MME, in step S475, the eNB stores the correlation identification in a mapping table which correlates the EPS bearer identifier of UE 1 and the EPS bearer identifier of UE 2. In step S480, the eNB transmits the bearer setup request messages to UE 1 and UE 2 respectively, for the ProSe communication, wherein each bearer setup request message further contains a correlation identification of the other UE for ProSe communication, and the EPS bearer identifier of the EPS bearer to be created for the ProSe communication with the other UE, wherein the correction identification indicates the other UE identified by a temporary UE identifier, which can be a newly created UE ID, ProSe ID or GUTI.

After UE 1 and UE 2 receive the bearer setup request messages from the MME, in step S485, UE 1 and UE 2 store the correlation identification of the other UE in a mapping table, wherein the mapping table includes the correlation identification and corresponding EPS bearer identifier, then in step S490, UE 1 and UE 2 transmit and receive packets for the ProSe communication via the EPS bearer according to the correlation identification. For example, when UE 1 transmits data packets to UE 2, it finds the correlation identification of UE 2 and carries the data packets in the associated EPS bearer for transmission, and UE 2 can receive data packets from the EPS bearer for ProSe communication with UE 1, wherein the eNB will schedule the uplink grants for UE 1 and the downlink radio block allocation for UE 2 at the same subframes for both of them to communicate with each other.

In summary, the present invention provides methods for two UEs in proximity to establish ProSe direct communication and ensure that the ProSe direct communication is feasible based on proximity criterion, in view of the system level and in view of the radio link level. The merits of the present invention include power saving and signaling overhead reduction, etc.

FIG. 5 is a flow chart of a process 50 illustrating a method for handling Proximity-based Service (ProSe) in a wireless communications system according to an embodiment of the invention with reference to the system in FIGS. 4A~4B. The process 50 is used in an eNB such as the eNB in FIGS. 4A~4B.

In step S505, the eNB transmits a location information report including the location information of a reporting UE which is a first UE or a second UE to the MME, when the eNB detects a cell change of the reporting UE or responds to a request from the MME which is for requesting current location information of the reporting UE. In the step S510, the eNB receives a ProSe discovery request message from the MME for initiating the ProSe communication preparation procedure. Then, in step S515, the eNB performs a ProSe communication preparation procedure with the first UE and the second UE, for guiding ProSe direct discovery between the first UE or the second UE in response to the ProSe discovery request message from the MME. The ProSe communication preparation procedure comprises the eNB scheduling radio resources for ProSe direct discovery and communication between the first UE and the second UE, transmitting a first ProSe direct discovery request message including scheduled information for the first UE and a second ProSe direct discovery request message including scheduled information for the second UE, and receiving ProSe direct discovery response messages from the first UE and the second UE. Next, in step S520, the eNB determines if a direct radio link between the first UE and the second UE is feasible for ProSe communication based on the ProSe direct discovery response messages from the first UE and the second UE. In step S525, the eNB transmits a ProSe discovery response message to the MME after the result of the ProSe direct discovery is determined. Next, in step S530, the eNB receives bearer setup request messages respectively for the first UE and the second UE including correlation identification and EPS bearer ID of the EPS bearer to be created for ProSe communication from the MME. In step S535, the eNB stores the correlation identification in a mapping table which correlates the EPS bearer identifier of the first UE and the EPS bearer identifier of the second UE. In step S540, the eNB transmits the bearer setup request messages to the first UE and the second UE respectively, wherein the message includes the correlation identification of the other UE and the EPS bearer ID to be created for ProSe communication.

FIG. 6 is a flow chart of a process 60 illustrating a method for handling Proximity-based Service (ProSe) in a wireless communications system according to an embodiment of the invention with reference to the system in FIGS. 4A~4B. The process 60 is used in an MME such as the MME in FIGS. 4A~4B.

In step S605, the MME receives a location information report including location information of a reporting UE, which is a first UE or a second UE, from an eNB. From the above, the location information report is sent from the eNB after the eNB detects a cell change of the reporting UE or is sent in response to a request (for requesting current location information of the reporting UE) from MME. Note that the location information includes at least one of an Evolved Universal Terrestrial Radio Access Network (E-UTRAN) cell global identity (EGCI) and a tracking area identity (TAI). The way how the eNB acquires location information of the UE is known to those skilled in the art and is not included or limited in the present invention.

In step S610, the MME transmits the location information report including location information of one of the first UE and the second UE identified by the ProSe identifiers of the first UE and the second UE to the ProSe server. Next, in step S615, the MME receives a ProSe communication request message from the ProSe server after the ProSe server authorizes the ProSe discovery and the ProSe communication between the first UE and the second UE. In step S620, the MME transmits a ProSe discovery request message to the eNB for initiating a ProSe communication preparation procedure. Then, in step S625, the MME receives a ProSe discovery response message from the eNB, after the eNB determines the result of the ProSe direct discovery based on ProSe direct discovery response messages from the first UE and the second UE. In step S630, the MME transmits a ProSe communication response message to the ProSe server, after the MME receives the ProSe discovery response message from the eNB. Next, in step S635, the MME performs a ProSe communication setup procedure with the eNB, for establishing an Evolved Packet System (EPS) bearer for the ProSe communication between the first UE and the second UE.

In addition, the processing unit 206 in FIG. 2 could execute the program code 210 to perform any one of the above-described processes 50 and 60, or others described herein.

Various aspects of the invention have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using another structure, functionality, or structure and functionality in addition to or other than one or more of the aspects set forth herein.

Those with skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those with skill in the art will further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

In addition, the various illustrative logical blocks, modules, and circuits described in connection with the aspects disclosed herein may be implemented within or performed by an integrated circuit ("IC"), an access terminal, or an access point. The IC may comprise a general-purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute code or instructions that reside within the IC, outside of the IC, or both. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for handling Proximity-based Service (ProSe) discovery and communication in a wireless communications system including, a base station, a Mobility Management Entity (MME) and a ProSe server, comprising:
    receiving, by the ProSe server, a location information report including location information of one of a first user equipment (UE) and a second UE in the wireless communications system identified by the ProSe identifiers of the first UE and the second UE from the MME, wherein the first UE and the second UE are served by the base station;
    determining, by the ProSe server, that the first UE and the second UE are located in a proximity area according to user discovery preference settings of the first UE and the second UE and a proximity criterion associated with location information of the first UE and the second UE;
    authorizing, by the ProSe server, ProSe discovery and ProSe communication between the first UE and the second UE;
    transmitting, by the ProSe server, in response to the authorization, a first proximity notification message and a second proximity notification message respectively to the first UE and to the second UE to notify that the first UE and the second UE are located in the proximity area;
    receiving, by the ProSe server, a first ProSe communication request message from the first UE and a second ProSe communication request message from the second UE for requesting the ProSe server to perform the ProSe communication between the first UE and the second UE, so as to transmit a ProSe communication request message to the MME;
    receiving, by the MME, the ProSe communication request message transmitted from the ProSe server;
    transmitting, by the MME, the ProSe discovery request message to the base station for initiating a ProSe communication preparation procedure;
    performing, by the base station, the ProSe communication preparation procedure, in response to a ProSe discovery request message, with the first UE and the second UE, for guiding ProSe discovery between the first UE and the second UE, one of the first UE and the second UE being an announcing UE, the other of the first UE and the second UE being a monitoring UE, wherein the ProSe discovery request message indicates ProSe identifiers of the first UE and the second UE for ProSe communication and the ProSe communication preparation procedure comprises transmitting a first request message including scheduled information for the first UE and a second request message including scheduled information for the second UE, to the first UE and to the second UE respectively, and receiving response messages from the first UE and the second UE;

repeating, by the base station, for an integer number of times, the ProSe communication preparation procedure, using a different respective resource allocation each of the integer number of times, in order to determine optimum radio resource allocation for ProSe communication;

determining, by the base station, whether a direct radio link between the first UE and the second UE is feasible for ProSe communication based on the received response messages from the first UE and the second UE;

sending, by the base station, a ProSe discovery response indicating the direct radio link is feasable for ProSe communication; and performing, by the MME, following steps in response to the ProSe discovery response:
  performing a ProSe communication setup procedure with the base station, for establishing an Evolved Packet System (EPS) bearer for a ProSe communication between the first UE and the second UE, wherein the ProSe communication setup procedure comprises following steps:
    generating and storing a correlation identification that correlates EPS bearer identifier of the first UE and the EPS bearer identifier of the second UE for the ProSe communication; and
    transmitting bearer setup request messages respectively for the first UE and the second UE including the correlation identification to the base station, to request the base station to establish an EPS bearer for the first UE and an EPS bearer for the second UE, respectively,
wherein each of the first UE and the second UE further performs following steps after receiving the bearer setup request message:
storing the correlation identification in a mapping table, wherein the mapping table includes the correlation identification and corresponding EPS bearer identifier; and transmitting and receiving packets for the ProSe communication via the EPS bearer according to the correlation identification.

2. The method for handling ProSe discovery and communication as claimed in claim 1, wherein the MME transmits a ProSe communication response message to a ProSe server after the MME receives the ProSe discovery response message from the base station.

3. The method for handling ProSe discovery and communication as claimed in claim 1, wherein the location information includes at least one of an Evolved Universal Terrestrial Radio Access Network (E-UTRAN) cell global identity and a tracking area identity.

4. The method for handling ProSe discovery and communication as claimed in claim 1, wherein
  the location information report includes the location information of a reporting UE which is the first UE or the second UE, to the MME, when the base station detects a cell change of the reporting UE or responds to a request from the MME which is for requesting a current location information of the reporting UE, wherein the location information includes at least one of an Evolved Universal Terrestrial Radio Access Network (E-UTRAN) cell global identity and a tracking area identity.

5. The method for handling ProSe discovery and communication as claimed in claim 1, wherein the ProSe server further performs following steps after determining that the first UE and the second UE are located in the proximity area:
  transmitting a proximity notification message to an application server to notify that the first UE and the second UE are located in the proximity area; and
  receiving the ProSe communication request message from the application server, wherein the ProSe communication request message includes information of users' profile for performing the ProSe communication.

6. The method for handling ProSe discovery and communication as claimed in claim 1, wherein the MME further performs following step before the MME performs the ProSe communication setup procedure:
  receiving a Non Access Stratum (NAS) message for requesting the ProSe communication setup procedure from one of the first UE and the second UE, wherein the NAS message is sent by the first UE or the second UE in response to a proximity notification message from a ProSe server or an application server.

* * * * *